3,186,662
EJECTION OF ONE BODY FROM ANOTHER
James Martin, Southlands Manor, Southlands Road,
Denham, near Uxbridge, England
Filed Nov. 7, 1961, Ser. No. 150,670
Claims priority, application Great Britain,
Nov. 7, 1960, 38,194/60
12 Claims. (Cl. 244—122)

This invention concerns the ejection of one body from another and may be applied to the ejection of a body or package from any form of vehicle, for instance a rocket, space-craft or the like, or even a ground vehicle; however, the invention is especially concerned with the ejection of an airman and his seat from an aircraft and will be described herein with particular reference to such application of the invention.

Thus, the invention is particularly applicable to the projection of aircraft ejection seats from aircraft, such seats usually comprising a seat pan mounted on a beam or frame (both hereinafter called, for convenience, a "seat frame") adapted to be projected with the seat pan bodily along a predetermined path from the aircraft, ejection means being provided to propel the ejection seat along the predetermined path from the aircraft as and when required as, for example, in an emergency either in the air or at ground level.

In aircraft ejection seats successfully adopted in practice in the past, ejection of the seat from the aircraft has been effected by means of an ejection gun comprising two or more telescopically co-operating parts adapted to be thrust axially apart by propulsion gases generated by the firing of at least one combustible cartridge, such gun operating between the seat frame and a fixed part of the aircraft and being located in such a position as to exert the thrust along the path that it is desired that the ejection seat should travel as it moves from the aircraft. The well known Martin-Baker aircraft ejection seats are of this character and are described in, amongst others, the Martin Patents Nos. 2,467,763, 2,527,020, 2,569,638, 2,708,083.

When an ejection seat/airman combination is ejected from an aircraft in an emergency it is extremely desirable that the seat/airman combination should obtain a high velocity along the predetermined path in as short a time as possible consistent with the application of physiologically acceptable acceleration values to the airman: that is to say, it is important that the trajectory of the seat/airman combination relative to the aircraft flight path at the time of ejection should be such that the combination will adequately clear parts of the aircraft, such as the empennage, in any flight condition and especially at high aircraft speeds and/or when ejection occurs during a dive. It is also vital that the seat/airman combination should have a trajectory of adequate height and duration to afford sufficient time for the deployment and effective operation of the airman's parachute or parachutes by which his subsequent descent is controlled when ejection takes place at low aircraft speeds and altitude (for instance at zero aircraft speed and zero altitude).

The ejection gun of an ejection seat of the above described character can only produce an effective accelerating thrust during the time that the telescopically co-operating parts of the gun are interengaged. This means that the ejection gun must produce a very high short-term acceleration in order to achieve a high seat/airman combination velocity and, accordingly, the maximum attainable velocity is limited by the maximum acceleration value that can safely be applied to the airman by the operation of the ejection gun.

When the object of endeavoring to attain higher velocities without imposing unacceptable accelerations upon the airman, it has been proposed to provide an ejection seat of the character described with a rocket motor which provides an accelerating thrust for increasing the seat/airman combination velocity beyond that attained by the action of the ejection gun. In such proposal, the rocket motor was incorporated in the ejection gun on the seat frame and, since the axis of the ejection gun did not extend through the centre of gravity of the seat/airman combination, the exhaust outlet of the rocket motor was inclined with respect to the ejection gun axis so that the thrust line of the rocket motor extended upwardly and forwardly approximately through the centre of gravity of the combination. It will be understood that, unless the thrust line of the rocket motor acts substantially through the centre of gravity of the combination, the rocket motor thrust will apply an undesired pitching moment to the combination.

Because the rocket motor thrust line of the aforesaid prior proposal was inclined to the initial trajectory of the seat/airman combination resulting from the action of the ejection gun, the initial trajectory of the combination would not be maintained but, instead the initial trajectory would be modified by the rocket motor thrust so as to have a forward velocity component. In high-speed level flight of the aircraft at the moment of ejection, such forward velocity component of the seat/airman combination could have been advantageous in assisting the combination to clear a high empennage but, in other circumstances, particularly at low speeds near the ground and with the aircraft in a nose down attitude, the forward velocity component could have resulted in the combination being propelled towards the ground.

An object of the present invention is to provide an ejection system in which the present day requirements are more nearly met than hitherto. A further object of the invention is to provide aircraft ejection seat arrangements in which seat ejection is effected or assisted by rocket propulsion and in which the trajectory of the seat/airman combination is suitable for safe ejection from the aircraft over a wide range of aircraft flight conditions, including the zero-speed, zero-altitude case.

Broadly stated, an ejection system in accordance with the present invention for ejecting a first body from a second body, for instance an aircraft ejection seat from an aircraft, comprises means for ejecting the first body from the second body along a predetermined path, such means including a rocket motor arranged to produce an accelerating thrust in or substantially in the direction of said predetermined path and along a line passing through or substantially through the centre of gravity of the first body.

Thus, in the case of the ejection of an ejection seat from an aircraft, the system of the present invention comprises an ejection gun, conveniently of the character described above, for effecting initial ejection of the seat from the aircraft along a predetermined path, the seat additionally carrying a rocket motor that produces thrust along a line extending through or substantially through the centre of gravity of the seat/airman combination and parallel or substantially parallel with the thrust line of the ejection gun.

The requirement for the thrust line of the rocket motor to extend through or substantially through the centre of gravity of the seat/airman combination and also to be coincident or substantially coincident with the predetermined path along which the seat leaves the aircraft necessitates the efflux from the rocket motor being directed generally downwardly from beneath the seat pan. The rocket motor may, if desired, be mounted on the seat frame and have an exhaust duct extending under the seat pan to a nozzle arranged to direct the efflux in the required direction or, as is preferred, the rocket motor may be mounted beneath the said pan. The arrangement may include a single rocket motor of appropriate thrust capability or, as is preferred, the arrangement may include a pack of rocket motors, each of low thrust capability but jointly providing the required thrust capability. The latter arrangement is preferred, especially in the case of mounting of the rocket motor beneath the seat pan, since a pack of small rocket motors jointly having the required thrust capability is more easily accommodated in the confined space available than is a single rocket motor of the required thrust capability.

Thus, in a preferred embodiment of the invention an ejection seat is provided beneath its seat pan with a pack of rocket motors having arrangements for simultaneous firing of the motors and having a common exhaust system. The exhaust system may consist of a single nozzle fed by all the rocket motors or, as is preferred since a more compact arrangement can be achieved thereby, the exhaust system may comprise a plurality of interconnected nozzles.

The invention will be further explained with the aid of the accompanying drawings in which:

FIGURE 5 is a front elevation of the rocket motor pack of FIGURE 3;

FIGURE 7 is a diagrammatic illustration of a convenient manner of securing the rocket motor pack of FIGURES 3 to 6 to an aircraft ejection seat.

Figure 1:
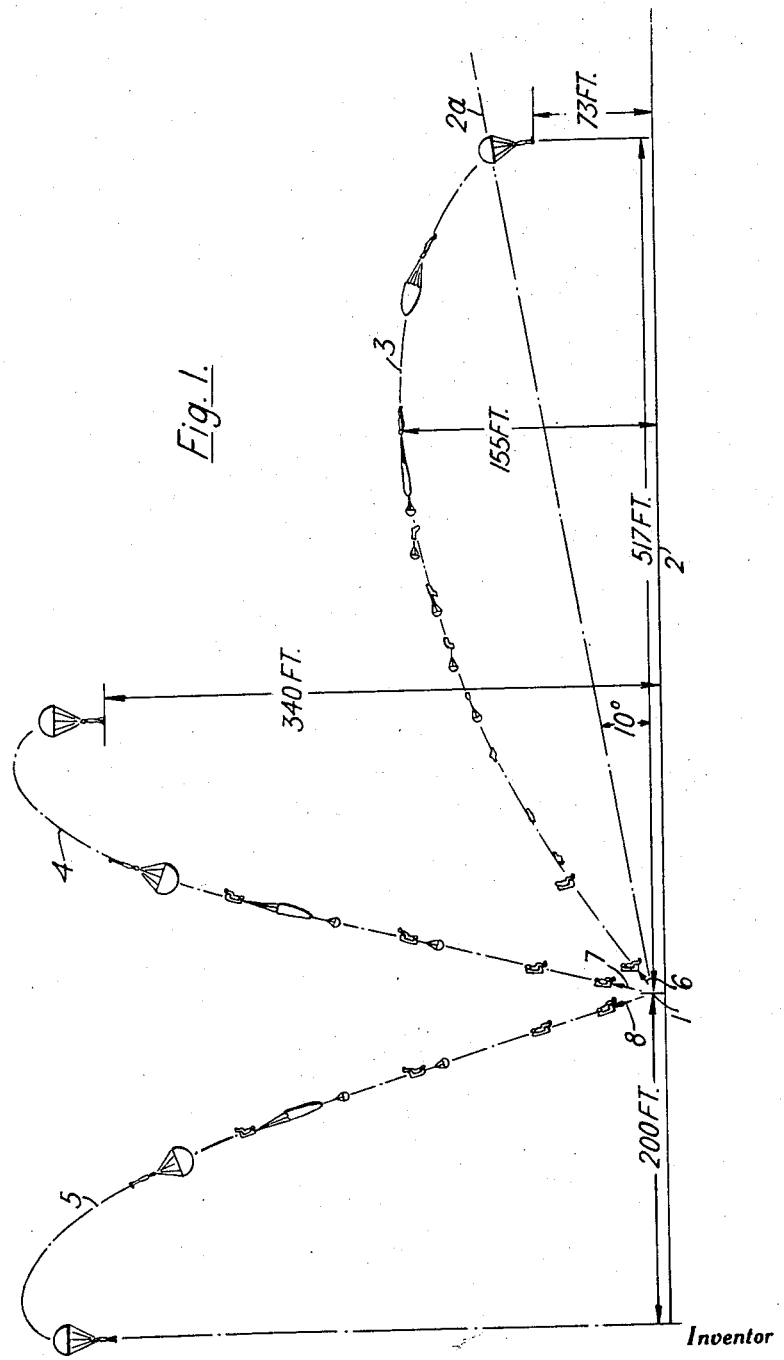
FIGURE 1 is a diagram illustrating various seat/airman combination trajectories resulting from ejection of such combination from an aircraft.

Referring to the drawings, FIGURE 1 is a diagrammatic illustration showing an aircraft 1 near the ground 2 and the various ejection seat/airman combination trajectories resulting from the ejection of the combination from the aircraft 1.

The trajectory indicated by the line 3 is that which was obtained in a test of an ejection seat fitted with a rocket motor in accordance with the prior proposal discussed hereinbefore when the aircraft 1 (represented by a test vehicle in the case of the test concerned) was moving forwardly (from left to right in FIGURE 1) at a speed of 56 m.p.h. Along the line 3 are shown diagrammatically the successive conditions of the seat/airman combination, the diagrams illustrating the separation of the airman from his seat and the deployment of his parachute. It will be noted that the trajectory 3 reached a maximum height of 155 feet above the ground and that the airman's parachute was fully deployed at a height of 73 feet above the ground following descent of the airman from the highest point of the trajectory. The horizontal extent of the trajectory was 517 feet.

The broken line 2a in FIGURE 1 represents the ground plane intersection of the trajectory 3 for the case of ejection from an aircraft diving towards the ground at an angle of 10° with ejection occurring immediately prior to impact, other conditions being as described above. It will be noted that the ground plane 2a intersects the trajectory 3 prior to full deployment of the airman's parachute.

The trajectory indicated by the line 4 in FIGURE 1 is that obtained by a test carried out under identical conditions with that described above but using an ejection seat installation in accordance with the present invention. It will be noted from the diagrammatic respresentation of the stages of the separation and parachute deployment sequence that in the case of this test the airman's parachute was substantially fully deployed by the time the airman had reached the highest point of the trajectory and that the airman was descending with a fully deployed parachute from a point 340 feet above ground level. It will be understood, therefore, that the aircraft could have been diving at a considerable angle towards the ground without the risk of the airman striking the ground prior to full deployment of his parachute.

The trajectory indicated by the broken line 5 in FIGURE 1 corresponds with that represented by the line 4 but in the case of ejection of a seat installation in accordance with the invention from a stationary vehicle at ground level and in still air conditions. It will be noted that in this case also, the airman's parachute was substantially fully deployed before the airman had reached the highest point of the trajectory and that he was descending with fully deployed parachute at a point some 350 feet above ground level and at a horizontal distance of about 200 feet rearwardly of the vehicle.

Reverting to the trajectory indicated by the line 3 in FIGURE 1, the thrust line of the rocket motor with which the ejection seat was equipped is indicated by the arrow 6. The rocket thrust line of the installation giving rise to the trajectories 4 and 5 is represented by the arrows 7 and 8 in FIGURE 1.

Figure 2:
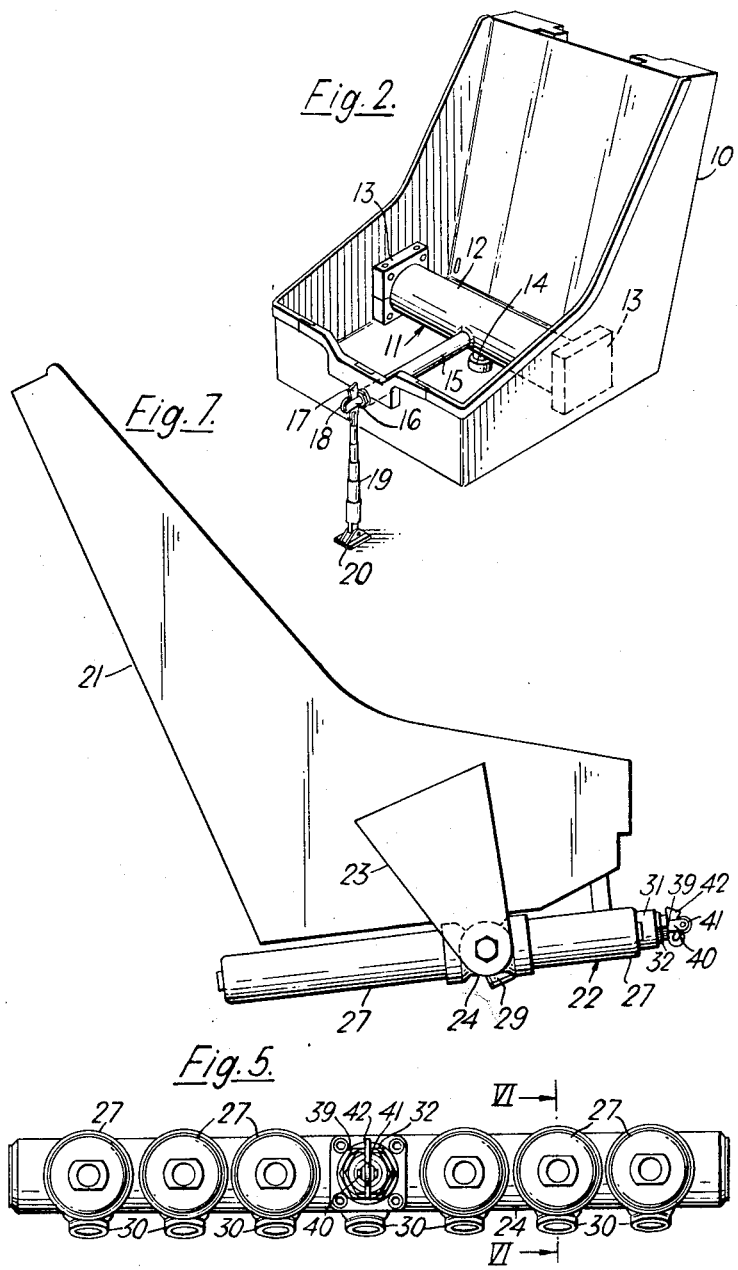
FIGURE 2 is a diagrammatic illustration of an aircraft ejection seat equipped with a rocket motor in accordance with the present invention.
Figure 3:
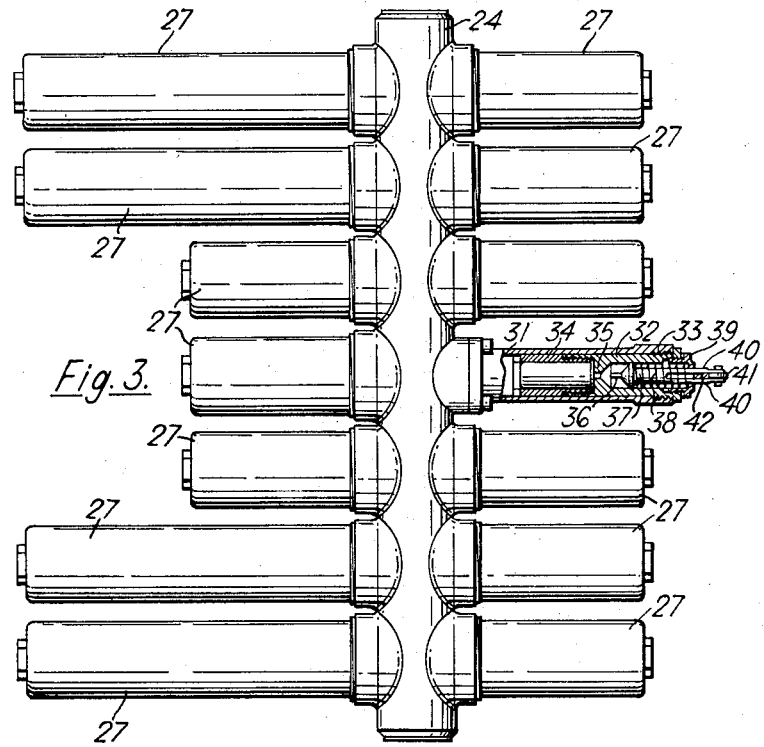
FIGURE 3 is a part-sectional plan view of a rocket motor pack forming a part of a preferred embodiment of the invention.
Figure 4:
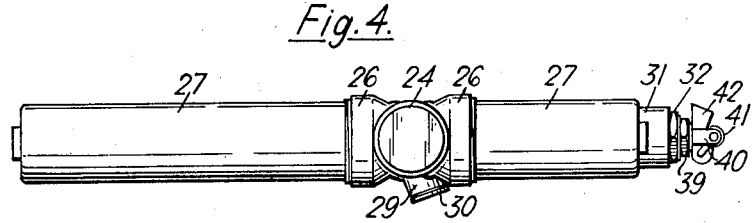
FIGURE 4 is a side elevation of the rocket motor pack of FIGURE 3.
Figure 8:
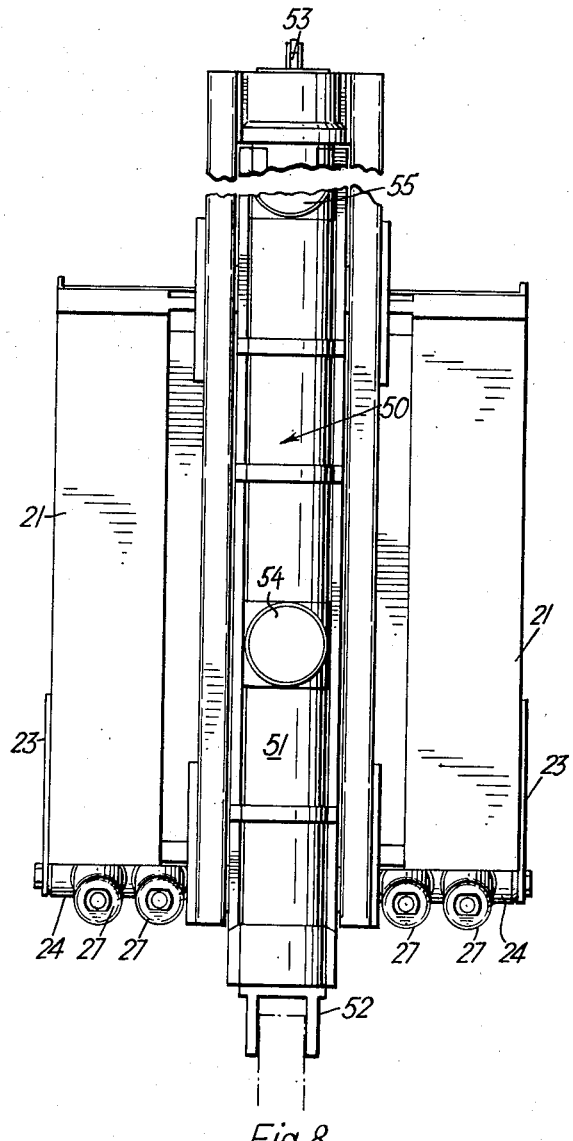
FIGURE 8 is a diagrammatic rear view of FIG. 7, showing a conventional ejection gun.

FIGURE 2 shows diagrammatically an aircraft ejection seat in accordance with the invention equipped with a single rocket motor. A conventional ejection gun which would in practice be employed with the seat is shown in FIGURE 8. Ejection gun 50, which effects initial ejection of the seat from the aircraft, is generally of the construction disclosed in U.S. Martin Patent No. 2,527,020. It comprises telescopically interfitted tubes including an outer tube 51, the lower end of which is secured to the aircraft structure, as indicated at 52. An inner tube (not shown) is secured at its upper end to the seat structure and mounts a firing mechanism and primary cartridge in the manner disclosed in my Patent No. 2,527,020. The firing mechanism includes a withdrawable sear 53 which, up withdrawal, first retracts and then releases a firing pin (not shown) that is impelled by a spring to fire the primary cartridge. Firing of the primary cartridge generates gas pressure within the gun to cause extension thereof to eject the seat. As the gun extends, secondary cartridges 54, 55 at the outer gun tube 51 are sequentially exposed to the hot gas within the gun to be fired and contribute incrementally to the gas pressure in the gun to boost the acceleration of the seat. As the seat leaves the aircraft, the gun tubes separate and the thrust due to the gas pressure within the gun rapidly decays, as the gas within the inner tube exhausts to atmosphere via the lower end of the tube.

The ejection seat shown in FIGURE 2 comprises a seat pan 10 supported by a seat frame which has not been shown. The back of the seat pan normally slopes upward and backward from the bottom of the pan as is conventional. The rocket motor in this case comprises a transversely extending canister 12 supported at its ends by means of suitable mounting brackets 13 on the seat pan 10. The canister 12 contains a suitable propellent charge, for instance an extruded tubular propellent body of known form so disposed in the canister that the propelling gases generated by combustion of the charge are led to a downwardly directed nozzle 14 extending from the mid-point of the lower wall of the canister 12. The canister 12 is so located and the nozzle 14 so directed that the nozzle axis, which defines the thrust line of the rocket motor, extends through or substantially through the centre of gravity of the seat/airman combination and substantially parallel with the thrust line of the ejection gun, i.e. substantially parallel with the initial trajectory of the seat following actuation of the ejection gun.

The ignition of the propellent charge in the canister 12 may be effected in any convenient manner and a suitable arrangement is that illustrated in FIGURE 2 in which the canister 12 is provided with a forwardly extending duct 15 the front end of which is formed as a breech for an initiating cartridge and is equipped with a firing pin mechanism that is actuated during the course of ejection of the seat from the aircraft.

In the illustrated arrangement, the firing pin mechanism includes a bifurcated plunger 16 embracing a sear 17 that co-operates with a roller 18 on the plunger 16 in such a manner that downwards withdrawal of the sear 17 from between the arms of the plunger 16 first causes forward movement of the latter to cock a spring (not shown) that thereafter drives the firing pin rearwardly to ignite the initiating cartridge when the sear 17 is ultimately withdrawn clear of the roller 18. The sear 17 is arranged to be withdrawn downwardly from between the arms of plunger 16 during the course of ejection of the seat so as to result in ignition of the propellent charge in canister 12 (by hot combustion products of the initiating cartridge) at an appropriate point in the ejection sequence.

Means for withdrawing sear 17 as above described may comprise, as shown, a telescopic member 19 the lower end of which is anchored by suitable bracket, as shown at 20, to the aircraft structure, the telescopic member 19 being arranged to extend during the course of initial ejection of the seat until the seat has reached the point at which the sear 17 is to be withdrawn, when the member 19 ceases to extend and thus holds the sear 17 stationary whilst the seat continues along its ejection path.

Although in the arrangement shown in FIGURE 2 the canister 12 is disposed within the structure of the seat pan 10, it will be understood that the canister 12 could alternatively be secured to the underside of the seat frame structure. Moreover, in place of a single canister, there could be two or more canisters of similar form to that shown, but containing smaller propellent charges, each such canister being connected to the duct 15 so that the charges in the canisters were all fired simultaneously. Moreover, the canister 12, or a plurality of smaller canisters, could alternatively be arranged so as to extend longitudinally, i.e. in the direction of the aircraft flight path, instead of transversely as shown.

An arrangement constituting a preferred embodiment of the invention is illustrated in FIGURES 3 to 7. In this embodiment the ejection seat shown diagrammatically in FIGURE 7 comprises a seat frame equipped with an ejection gun (not shown) of the character hereinabove described and carries, beneath the seat pan 21, a rocket motor pack generally indicated at 22. The pack 22 is conveniently secured to the seat pan 21 by means of dependent brackets 23 on each side of the seat pan 21.

The construction of the rocket motor pack 22 is shown in detail in FIGURES 3 to 6 and, as will be seen from these figures, the pack comprises a central tubular spine 24 that is closed at its ends and adapted to be supported at its ends by the aforesaid brackets 23. The spine 24 has at intervals along its length diametrically opposed ports 25 (see FIGURE 6) that communicate with tubular bosses 26 welded or otherwise suitably secured to the spine and having internal screw threads to receive complementary screw-threaded heads of canisters 27 containing charge of propellent. As will be observed from FIGURE 3, the canisters 27 are of different lengths and contain different amounts of propellent charges, the arrangement of the canisters of different size on the spine 24 being selected to provide an appropriate location of the centre of gravity of the rocket motor pack as a whole. It will of course be understood that the total propellent charge weight is selected to provide the pack with a desired thrust capability and burning time and it will be apparent that the arrangement is adaptable to different installations by appropriate selection of canister sizes to be fitted to the spine to give a desired total charge weight.

Figure 6:
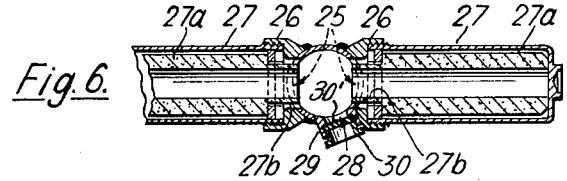
FIGURE 6 is a fragmentary longitudinal sectional view on line VI—VI of FIGURE 5.

The charges in the canisters 27 are preferably extruded or similarly formed tubular bodies of solid charge material as indicated at 27a at FIGURE 6. For reasons that will be explained, the charge 27a in each canister preferably has a terminal extension 27b that extends through the relevant port 25 in the spine 24 so as to project into the bore of the latter.

The spine 24 is further provided at intervals along its length with a series of exhaust ports 28 that, as shown in FIGURE 6, have their axes directed forwardly and downwardly from the axis of the spine 24 when the latter is so orientated that the canisters 27 are in a substantially horizontal attitude. The ports 28 communicate with nozzle stubs 29 having hollow plugs 30 therein, such plugs 30 retaining frangible diaphragms 30' (FIG. 6) that close the ports 28 until the charges in the canister 27 are fired.

Near the mid-point of its length the spine 24 has a port equivalent to a forward-facing port 25 but communicating with a breech tube 31 instead of with a canister 27 as in the case of the ports 25. The breech tube 31 mounts a firing mechanism that comprises a tubular body 32 which fits within the breech tube 31, being secured in the latter by means of co-operating screw threads 33 on the body 32 and breech tube 31 respectively. The inner end of the body 32 is formed by a detachable tubular plug 34 that constitutes a housing for an initiating cartridge (not shown), the body 32 being divided internally into two chambers by a partition 35 having a central aperture through which a firing pin 36 may pass to enter the initiating cartridge housing 34 and fire a cartridge located therein.

The firing pin 36 is mounted on the head of a bifurcated plunger 37 urged towards the partition 35 by means of a compression spring 38 trapped between the head of plunger 37 and a cap 39 that closes the outer end of the body 32. The plunger 37 extends through a central aperture in the cap 39 and the arms 40 of such plunger support a roller 41 for engagement with a sear 42 that extends between the arms 40 and is interposed between the roller 41 and the cap 39, whereby withdrawal of the sear first causes outwards (forwards) movement of the plunger 37 to compress spring 38 and thereafter releases the plunger 37 so that the spring 38 may impel the plunger inwardly and cause the firing pin 36 to pass through the aperture in the partition 35 to ignite an initiating cartridge in the cartridge housing 34 at the inner end of the body 32.

The arrangement for withdrawing the sear 42 at an appropriate instant during the ejection sequence may be of any suitable form and may, for instance, be as described with reference to the arrangement shown in FIGURE 2.

It will be understood that when an initiating cartridge in the cartridge housing 34 is fired by the operation of the firing pin 36 upon withdrawal of the sear 42, the hot combustion products of such cartridge will enter the bore of spine 24. Since a canister 27 is mounted on the spine 24 directly opposite to the breech tube 31, the charge in such canister will immediately be ignited by the blast of hot combustion products entering the spine from the breech tube 31 and because the charges in the other canisters project into the bore of the spine 24 through their respective ports 25 the charges 27a in at least those canisters 27 near to the breech tube 31 will also be ignited by the hot combustion products entering the spine from the breech tube 31. Any charges 27a not so ignited by the said hot combustion products will of course become ignited almost immediately by the efflux entering the spine 24 from the ignited charges 27a.

The frangible diaphragms that close the ports 28 are designed to have sufficient strength to resist rupture by the pressure wave due to the ignition of the initiating cartridge so that the spine is maintained sealed against the external atmosphere until at least one of the charges 27a has ignited and built up pressure in the spine sufficient to rupture the frangible diaphragms. In this way it is ensured that at least one of the charges will be properly ignited before the spine is unsealed. It will be understood that in certain circumstances, for instance at high altitude, ignition of the charges 27a might be prejudiced by low atmospheric pressure within the spine 24 were this open to the atmosphere prior to full ignition of at least one charge 27a.

It has been mentioned that in an arrangement in accordance with the present invention the ejection gun is first fired to effect initial ejection of the seat/airman combination from the aircraft whereafter the rocket motor or motors is or are fired to provide additional acceleration of the combination. The point in the ejection sequence at which the rocket motor or motors is or are fired is preferable so selected that the rocket thrust builds up during the decay of ejection gun thrust so that the acceleration of the seat/airman combination does not drop to zero in the interval between firing of the ejection gun and firing of the rocket motor or motors.

In a typical arrangement in accordance with the invention the ejection gun may rapidly build up a thrust producing an acceleration of perhaps 15 $g$ which then decays substantially to zero by the time the telescopic cooperating parts of the ejection gun separate, the rocket motor or motors being designed to produce an acceleration of perhaps 10 $g$. The point of firing of the rocket motor or motors is preferably so chosen that the rocket motor or motors produce a build up of rocket thrust during the decay of ejection gun thrust such that the acceleration of the seat/airman combination at no time falls below 10 $g$ until decay of the rocket thrust commences. By the adoption of such firing point for the rocket motor or motors, the airman is subjected to a reasonably constant acceleration following the peak acceleration achieved by the ejection gun in the early stages of the ejection sequence.

What I claim is:

1. An ejection system for ejecting an airman from an aircraft comprising, in combination:
    (a) aircraft seat means for holding an airman therein in a position in which said seat means and said airman have a common center of gravity;
    (b) ejection gun means for accelerating said seat means and the airman held therein relative to an aircraft in a predetermined direction;
    (c) rocket motor means carried by said seat means independently of the ejection gun means for producing thrust along a vector extending substantially through said common center of gravity in a direction substantially parallel to said predetermined direction; and
    (d) firing means for firing said rocket motor means independently of the ejection gun means after said seat means has been accelerated by said ejection gun means.

2. The ejection system of claim 1 wherein said aircraft seat means has a bottom portion and a back portion normally sloping upwardly and backwardly from said bottom portion, and said rocket motor means includes at least one exhaust port under said bottom portion and forwardly spaced from said back portion, said exhaust port having an axis directed forwardly and downwardly from said bottom portion.

3. The system of claim 1, the seat means including a seat pan and the rocket motor means being mounted beneath the seat pan.

4. The ejection system of claim 1, wherein the rocket motor means includes a pack of rocket motors.

5. The ejection system of claim 4, wherein the firing means is common to the rocket motors of said pack for substantially simultaneously firing the rocket motors.

6. The ejection system of claim 4, further comprising a common exhaust system for the rocket motors of said pack.

7. The ejection system of claim 4, wherein said pack of rocket motors comprises a tubular spine having a plurality of exhaust ports for exhaust of propellant gases, a plurality of canisters mounted on said spine, and a propellant charge in each of said canisters, the firing means including means for igniting the propellant charges in the canisters substantially simultaneously.

8. The ejection system of claim 7, wherein said canisters are detachably mounted on said spine.

9. The ejection system of claim 7, wherein said firing means comprises a breech tube communicating with the tubular spine and an initiating cartridge in said breech tube, the breech tube communicating with the tubular spine for conducting combustion products from the initiating cartridge into the spine to ignite the propellant charges in the canisters.

10. The ejection system of claim 9, wherein said breech tube further houses a firing pin for the initiating cartridge and means resiliently urging the firing pin into a cartridge firing position, means cooperating with the firing pin for first moving the firing pin to store energy in the resilient means and for thereafter releasing the firing pin to be impelled to said cartridge firing position by the energy stored in the resilient means.

11. The ejection system of claim 10, wherein the means cooperating with the firing pin includes means for impelling said firing pin to said cartridge firing position after said seat means has been accelerated by said ejection gun means, whereby the rocket motor means thrust builds up during decay of the thrust of said ejection gun means.

12. The ejection system of claim 7, further comprising a frangible diaphragm for each of said exhaust ports and closing the ports whereby the spine is sealed until at least one propellant charge has been ignited.

References Cited by the Examiner

UNITED STATES PATENTS

| | | | |
|---|---|---|---|
| 2,541,087 | 2/51 | Musser | 244—122 |
| 2,552,181 | 5/51 | Kleinhans | 244—122 |
| 2,703,960 | 3/55 | Prentiss | 60—35.6 |
| 2,736,236 | 2/56 | Martin | 244—122 X |
| 2,900,150 | 8/59 | Hirt et al. | 244—122 |
| 2,931,598 | 4/60 | Sanctuary | 244—122 |
| 2,941,764 | 6/60 | Lee | 244—140 |
| 2,954,947 | 10/60 | Zabelka et al. | 244—122 |
| 2,998,213 | 8/61 | Pitts | 244—122 |
| 3,027,125 | 3/62 | Fulton | 244—122 |
| 3,055,619 | 9/62 | MacDonald et al. | 244—122 |
| 3,079,111 | 2/63 | Throp | 244—122 |

FOREIGN PATENTS 918,006 9/54 Germany.

FERGUS S. MIDDLETON, *Primary Examiner*

MILTON BUCHLER, *Examiner.*